Feb. 20, 1934.     W. H. TAYLOR     1,947,745
TRUNK AND CARRIER FOR AUTOMOBILES
Filed Dec. 15, 1930
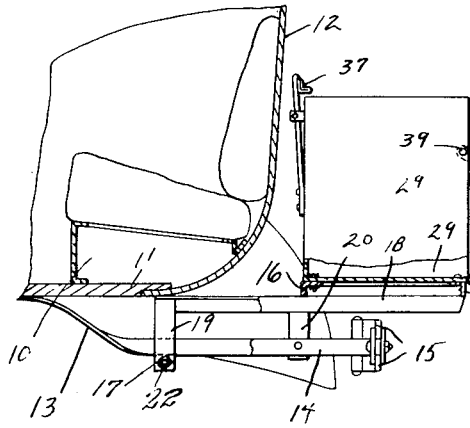
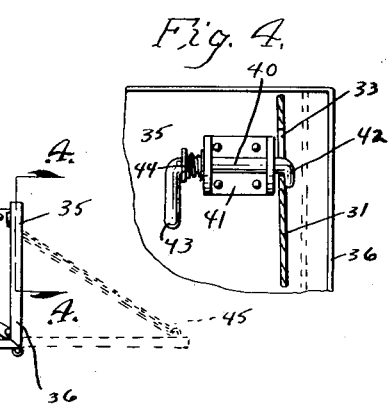
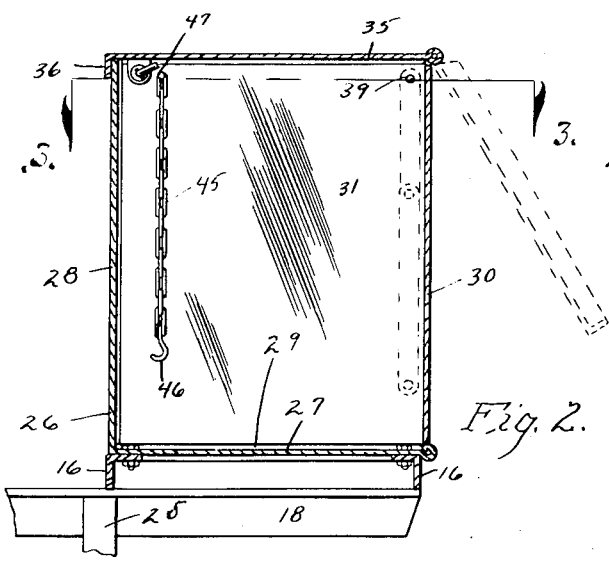
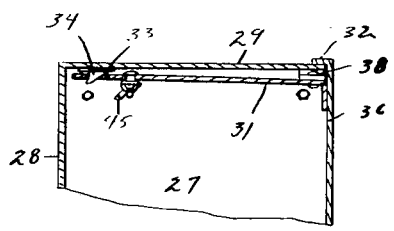
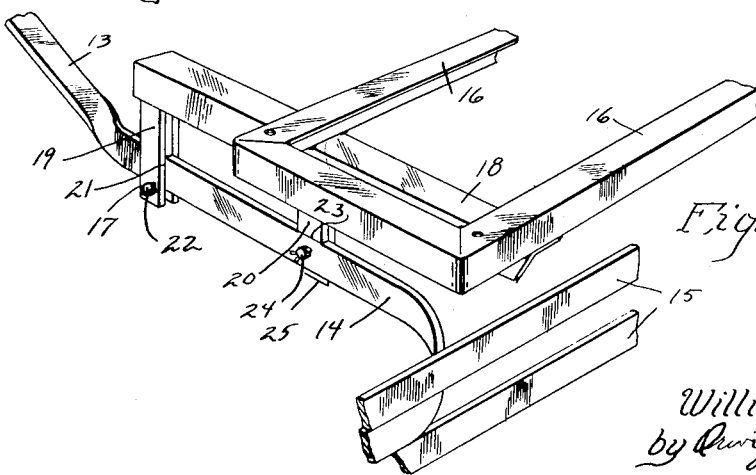
Inventor
William H. Taylor
by Orwig & Hague  Attys Patented Feb. 20, 1934

1,947,745

UNITED STATES PATENT OFFICE 1,947,745

TRUNK AND CARRIER FOR AUTOMOBILES

William H. Taylor, Des Moines, Iowa

Application December 15, 1930.
Serial No. 502,384

2 Claims. (Cl. 224—29)

The object of this invention is to provide a detachable trunk carrier which may be easily and quickly placed on the rear bumper bars of an automobile without the use of tools other than a wrench, and when so placed will provide a trunk adapted for a comparatively large number of uses, and capable of being opened and extended to carry various kinds of articles.

A further object is to provide in a trunk having hinged back and top members, improved means for locking and supporting the back and top members in their operative positions.

A further object is to provide in a trunk of the class described improved means for detachably mounting the trunk to the rear bumper bars of an automobile.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of my improved trunk supported in its open position and showing the manner in which it is connected to the rear bumper bars of an automobile, the rear portion of the automobile body being shown in section.

Figure 2 is a transverse sectional view of the trunk in its folded position.

Figure 3 is a detail sectional view taken on the line 3—3 of Figure 2.

Figure 4 is a detail sectional view taken on the line 4—4 of Figure 1.

Figure 5 is a detail perspective view of one end of the trunk supporting frame showing the manner in which it is connected to one of the rear bumper bars of an automobile.

Referring to the accompanying drawing, the reference numeral 10 indicates an automobile body having a frame member 11 and a back member 12. Secured to the under surface of each of the frame members 11 is a bumper bar 13 curved downwardly and rearwardly and terminating in a rearwardly extending portion 14. The members 14 are provided with bumpers 15 secured to the members 14 in the usual manner.

The frame for supporting the trunk comprises a pair of parallel angle irons 16 having their ends connected by a cross member to form a substantially rectangular frame of a length substantially equal to the width of the automobile body.

Supported beneath each end of the said frame is a supporting bar 18 secured to the member 16 by welding. The forward ends of the bars 18 extend forwardly to position beneath the rear end of the frame members 11. Said members 18 have downwardly projecting brackets 19 and 20. The bracket members 19 have their lower ends each provided with a notch 21 for receiving the bumper bar 14. A bolt 22 is passed through suitable openings in the lower end of the bar 19 and designed to pass beneath the lower edge of the bumper bar 14. A nut 17 is provided for retaining the bolt in position.

The bracket 20 is provided with a shoulder 23 designed to rest on the upper edge of the bar 14 with the lower end of the bracket adjacent to the inner face of said bar. A pin 24 is then inserted through suitable openings in the bar 14 and the lower end of the bracket member 20. The lower end of the bracket member 20 is provided with a laterally extending lug 25 designed to carry the lower edge of the bar 14.

By this arrangement it will be seen that the trunk supporting frame may be easily and quickly attached or detached from the bumper bars by simply removing the pins 24 and the bolts 22.

Supported on the trunk frame is a trunk comprising a main body section 26 having a bottom member 27 bolted to the frame members 18 and provided with an upwardly projecting front member 28 and side members 29. Said bottom, front and side members are rigidly secured together.

Hinged to the back edge of the bottom 27 is a back member 30, each end of which is provided with inwardly projecting side members 31 designed to be supported within the side members 29 when the trunk is in its normal folded position as shown in Figure 2.

Each end of the back 30 is provided with a forwardly extending flange 32 designed to overlap the outer face of the rear edges of the side members 29, in the manner clearly illustrated in Figure 3.

The upper forward corner of each of the side members 31 is provided with an opening 33 designed to receive a hook 34 fixed to the inner faces of the said members 29, when the said side members are in their folded positions. The hooks 34 automatically latch the side members 31 in their folded positions, said side members being formed of yieldable metal so arranged as to spring into latching position as the said side members are moved over the inclined hooks 34 in the manner illustrated in Figure 3.

The top edge of the back 30 is hinged to the back edge of the top member 35. The front and side edges of the top 35 have a downwardly extending flange 36 designed to overlap the top edges of the front 28 and the side members 29.

A latch 37 is provided for retaining the top 35 in a closed position.

It will be seen by the construction above described that the top 35 is adapted to be folded upwardly and rearwardly so that articles may be placed inside of the trunk. It will further be seen that by swinging the forward edges of the side members 31 inwardly, the said side edges may be made to disengage the hooks 34 and permit the back 30 to swing to a horizontal position with the side members 31 projecting upwardly and rearwardly of the side members 29. Pivoted braces 38 are provided for supporting the said back in a horizontal position.

One of the braces 38 is pivotally connected to the rear edge of a corresponding side member 29 by a pivot 39, while the opposite end of the pivot bar 38 is pivotally connected to the lower rear corner of the side member 31 when in its unfolded position, as shown in Figure 1.

When the back 30 is in a horizontal position, the top member 35 will be latched to the rear edges of the members 31 by means of bolts 40 mounted in brackets 41 secured to the said top. The outer end of each bolt is provided with a bent portion 42 designed to enter the openings 33, and to be rotated to a locking position as illustrated in Figure 4. A handle 43 is provided for rotating the bolt. A spring 44 is provided for frictionally retaining the bolt in its open or closed position.

It sometimes happens that it is desirable to swing the top 35 to a horizontal position, as shown by dotted lines in Figure 1. This may be accomplished by releasing the bolts 40 from the openings 33 and permitting the top to swing in said horizontal position. The outer end of the top is held against downward movement by means of chains 45, each chain having a hook 46 designed to engage the bolts 40. The opposite ends of the chains 45 are secured to the side members 31 by suitable rivets 47.

Thus it will be seen that I have provided a trunk comprising a main body section and an auxiliary body section, the auxiliary body section consisting of the back 30 and the end members 31 and the top 35, with means whereby the auxiliary body section may be folded into the main body section, and whereby the top of the auxiliary body section may be opened to a horizontal position so that a trunk having a front, a bottom and side members is provided, with its back open.

Thus means is provided whereby comparatively large articles may be easily and quickly inserted without having to lift them over the top of the side and back members, or whereby articles too large to be carried in the main body section may be easily carried.

By locking the top in an upright position when the auxiliary body portion is folded to an open position, it will be seen that a trunk or box is provided having substantially twice the area of the main trunk section.

It will further be seen that means is provided whereby the trunk together with its supporting frame may be easily and quickly attached to the bumper bars already supplied on the automobile by the use of tools such as carried in the ordinary automobile tool kit.

It will further be seen that I have provided means for supporting the body sections in their various operative positions, so constructed and arranged that the parts will be rigidly and firmly supported, and the device may be easily and quickly adjusted to its various operative positions.

I claim as my invention:

1. A trunk comprising a main body section having a bottom, front and side members, an auxiliary body section comprising a back having one edge hinged to the back edge of said bottom, a top hinged to the top edge of said back and designed to cover the top of the main body section, side members secured to said back designed to be overlapped by the first side members when said sections are in a folded position, means for locking said second side members to the first side members when said body sections are in a folded position, means for limiting the outward swinging movement of said back to a position in alinement with the bottom of the main body, and means for limiting the outward swinging movement of said top to a position in alinement with said back when the said back and top members are in their unfolded positions.

2. A trunk comprising a main body section having a bottom, front and side members, an auxiliary body section comprising a back having one edge hinged to the back edge of said bottom, a top hinged to the top edge of said back and designed to cover the top of the main body section, side members secured to said back and designed to be overlapped by the first side members when said body sections are in a folded position, the last side members having openings, hooks carried by the side members of the main body portion received in said openings when said body sections are in a folded position, the side members of said back being formed of resilient material, means for limiting the outward swinging movement of said back to a position in alinement with the bottom of the main body, and means for limiting the outward swinging movement of said top to a position in alinement with said back when the back and top members are in their unfolded positions.

WILLIAM H. TAYLOR.